United States Patent Office 2,905,047
Patented Sept. 22, 1959

2,905,047

PLANE INDICATORS

Georges Jiri Vogl, Bromma, Sweden, assignor to Svenska Ackumulator Aktiebolaget Jungner, Stockholm, Sweden, a corporation of Sweden Application April 15, 1957, Serial No. 652,815

Claims priority, application Sweden April 21, 1956

4 Claims. (Cl. 88—14)

The present invention relates to an indicator for determining the positions of different points relatively to a predetermined plane, the measuring plane.

The primary object of the invention is to provide a plane indicator for use in the manufacture of machine elements. In such manufacture it is often necessary to be able to determine quickly and accurately whether certain points in a surface are located in the same plane or in different planes, the distances of which from the measuring plane are definite. Thus, the object of the invention is, primarily, to provide an indicator suited for such determinations.

The invention is based on the use of an optical member which is able to reflect two incident rays differently, i.e. one ray is reflected an odd number of times and the other ray is reflected an even number of times. Further, the invention is based on the use of two marks which are in fixed relation to one another but movable relatively to the optical member, the images of said marks after reflexion in the optical member being observed in an optical observation unit such as a spy-glass or a microscope.

The spy-glass or microscope and the optical member preferably are mounted in a frame adapted to be placed on or secured to the surface to be controlled or measured. It may then be desirable to have the optical member mounted pivotally so as to make it possible to measure in different directions without moving the frame. The pivot axis of the optical member must then be perpendicular to the measuring plane, which is preferably parallel to the supporting surface of the frame.

The optical member may consist of a prism in which the image is reflected an uneven number of times and of a second prism in which the image is reflected an even number of times. According to one embodiment of the invention, the optical member may be constituted by two 30° prisms, which are cemented together into a 60° prism, the common surface being semi-mirrored or being entirely mirrorized for a portion thereof. Depending on the special field of use of the instrument, other constructions may of course also be taken into consideration, such as a pentagon prism and an ordinary prism, or, in the simplest case, a so-called Dove-prism covering a half of the diameter of the objective.

To facilitate measurements in different directions, it will be found advantageous to extend the axis of the spy-glass at right angles to the measuring plane and to form the optical member so that the outgoing pencil of rays is perpendicular to the incident pencil of rays.

The measuring marks are preferably constituted by a scale and an index. The scale should be provided with a 0-line approximately midway of the scale and with positive and negative scale lines. The distance between the 0-line and the index shall be equal to the distance between the two rays emanating from the optical member, when a ray is sent from the ocular side into the spy-glass along the optical axis thereof.

The plane indicator and its mode of operation will be described more closely with reference to the accompanying drawings which illustrate an example of the practical construction of the plane indicator.

Figures 1, 2, 3:
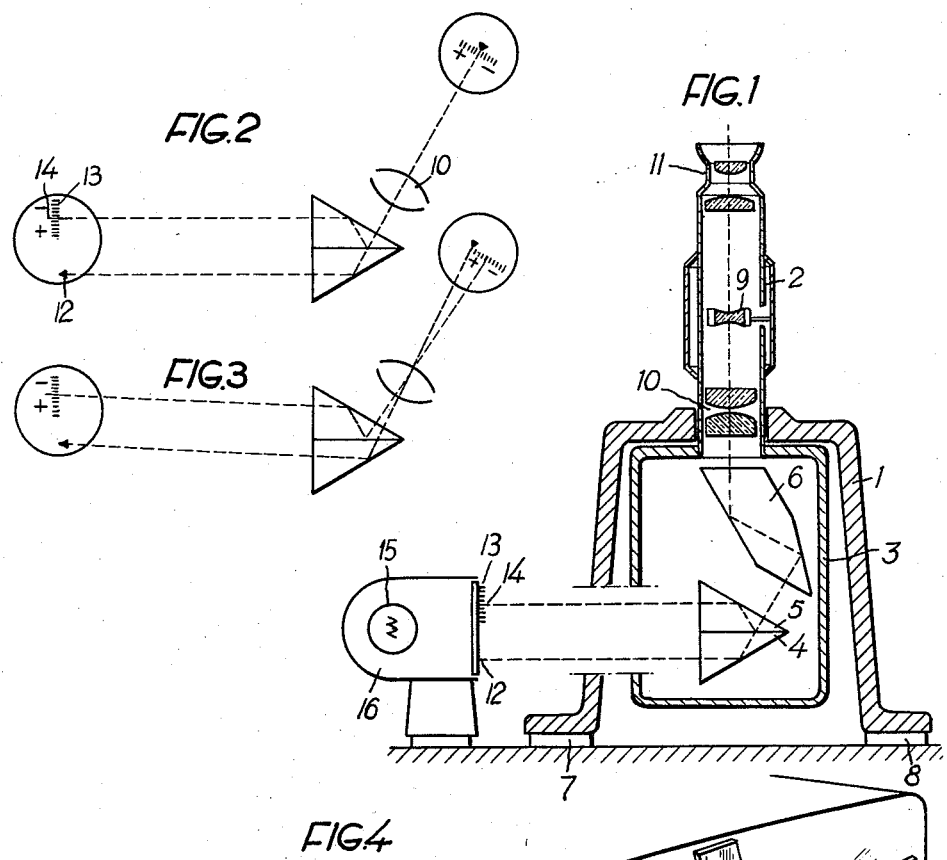
Fig. 1 shows a section through a plane indicator according to the invention with its appurtenant measuring marks.
Figs. 2 and 3 illustrate schematically the light beam in the plane indicator, when the measuring marks are located symmetrically with respect to the measuring plane and when they are displaced upwardly in said plane, respectively.

In Fig. 1, 1 designates a frame which carries a spy-glass 2 and a housing 3 located in front of the spy-glass and containing the optical member, which consists of the prisms 4 and 6. The housing 3 may be arranged to be pivotal relatively to the frame 1, and its pivot axis shall then be perpendicular to the measuring plane, which preferably parallels the supporting surfaces 7 and 8 of the frame. The prism 4 pertaining to the optical member is a 60° prism obtained by cementing two 30° prisms together, the common surface 5 being semi-mirrored or entirely mirrorized on a portion, for instance a half thereof. The surface 5 then defines the measuring plane. The prism 6, in combination with prism 4, has for its object to turn the pencil of rays by 90° from the direction of the incident pencil of rays. The spy-glass 2 is provided in the ordinary way with an objective 10 and an ocular 11. To facilitate focusing of the spy-glass to different distances, the ocular 11 may be displaceable, but the ocular is advantageously made stationary with a special displaceable lens 9 inserted between the objective and the ocular.

The measuring marks associated with the plane indicator may preferably be mounted in a housing 16. The measuring marks are preferably constituted by a scale 13 with a 0-line 14 and an index 12 arranged on an illuminated glass plate. The illumination is provided for by a lamp 15.

Figs. 2 and 3 show the mode of operation of the plane indicator. In Fig. 2, the measuring marks 12 and 14 are at equal distances from the plane of symmetry 5 (the measuring plane) of the prism 4. When the measuring marks are regarded through the spy-glass, the index 12 then appears as lying right over the 0-line 14 of the scale 13. Fig. 3 shows the measuring marks as being somewhat displaced upwardly with respect to the plane of symmetry. The index 12 then appears as having moved relatively to the scale, and if the graduation of the scale is properly made, the displacement can be read off directly. Due regard will have to be paid to the fact that the index 12 and the 0-line of the scale are on different sides of the plane of symmetry 5 as well as to the circumstance that in connection with a displacement the scale and the index are moved in opposite directions. For example, if it is desired to read off 0.1 mm., the individual degrees of the scale shall be 0.2 mm.

Figure 4:
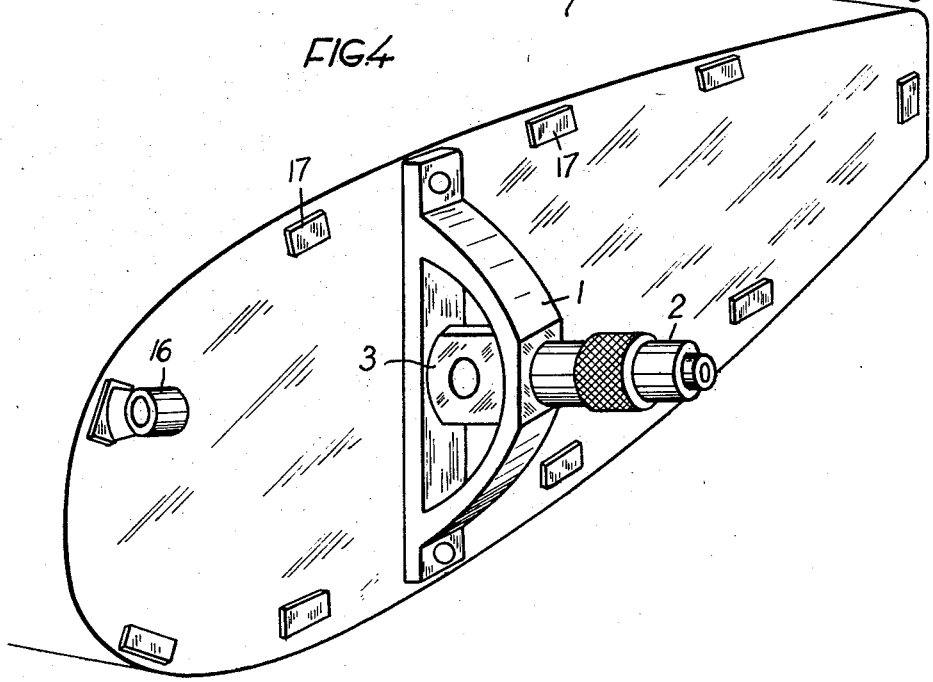
Fig. 4 shows an example of the use of the plane indicator according to the invention.

Fig. 4 shows the use of the plane indicator for the control of the abutting surfaces of an airplane wing. In certain types of aircraft the wings and the fuselage are provided with abutting blocks, which at the securing of the wings are brought together and tightened against one another by means of bolts or the like. It is important that the abutting surfaces of all of these blocks be located in one plane within a certain tolerance. With the use of a plane indicator according to the invention the frame 1 of the indicator is formed so as to permit of being secured onto two of said surfaces, after which the location of the remaining abutting blocks 17 may be measured relatively to the two first-mentioned blocks or possibly relatively to the same and to a block of reference.

The measuring plane mentioned hereinbefore is defined as the plane that contains the line of symmetry of the two rays emanating from the optical member, when a ray is sent from the ocular side into the spy-glass along the optical axis thereof, and as a plane which is normal to a plane extending through the emanating rays.

The advantage of a plane indicator according to the invention in comparison with a levelling instrument is that for a certain accuracy the magnification may be selected to be half as great, the field of view being consequently larger and the work with an instrument of this type becoming easier. Furthermore, the instrument need not be equipped with a hair-cross reticle in the plane of view of the objective, all measurements and all accuracies depending solely on the measuring marks and on the prism system. Errors in the centricity of the objective or of the focusing lens, or errors caused by mechanical deformations in the spy-glass, have no influence on the measuring result.

What I claim is:

1. An indicator for determining the level of a plane at different points relatively to a predetermined plane, comprising one sighting instrument and one target to be sighted by means of the said sighting instrument; the target having one index mark and, arranged at a distance from said index mark in a direction perpendicular to the plane to be determined, one scale with a zero-point and positive and negative lines; said index mark and said scale being permanently fixed in relation to each other, the sighting instrument having an optical observation unit and a system of prisms; the said target and sighting instrument being provided with supports, and the prism system being arranged to provide for superposition viewing of images of the index mark and scale in the observation unit, the image of the index mark being arranged to coincide with the zero-point of the scale when the target and the sighting instrument are positioned in the same plane.

2. An indicator in accordance with claim 1, wherein the prism system consists of one prism formed from two 30° prisms cemented together and having a semi-mirrored surface at their interface, said surface being parallel with the plane in which the sighting instrument is positioned, and forming a plane of symmetry with respect to the scale and index mark when the target and the sighting instrument are positioned in the same plane, the said prism being arranged to accept the light from the scale and index mark on the respective sides of the semi-mirrored surface, and to reflect and combine said light in such a manner as to render the images of the scale and index mark superposed in the final viewing through the optical observation unit.

3. An indicator in accordance with claim 1, wherein the prism system consists of two prisms; a first prism formed from two 30° prisms cemented together and having a semi-mirrored surface at their interface, said surface being parallel with the plane in which the sighting instrument is positioned, and forming a plane of symmetry with respect to the scale and index mark when the target and the sighting instrument are positioned in the same plane; and a second prism adapted to receive light from said first prism and to direct said light along the optical axis of the observation unit; the first prism being arranged to accept the light from the scale and index mark on the respective sides of the semi-mirrored surface, and to reflect and combine said light in such a manner as to render the images of the scale and index mark superposed in the final viewing through the optical observation unit, whereby the second prism is arranged to transmit to the observation unit the said combined light from the first prism.

4. An indicator in accordance with claim 3, wherein the optical axis of the observation unit is perpendicular to the plane in which the sighting instrument is positioned, and at least the system of prisms is mounted turnably around the said optical axis in the support of the said sighting instrument.

References Cited in the file of this patent

UNITED STATES PATENTS

| | | |
|---|---|---|
| 1,497,357 | Comstock | June 10, 1924 |
| 2,055,684 | Eppenstein | Sept. 29, 1936 |
| 2,410,942 | Holman | Nov. 12, 1946 |
| 2,607,260 | Cowley | Aug. 19, 1952 |
| 2,830,488 | Agnew | Apr. 15, 1958 |